(12) United States Patent
Sayed et al.

(10) Patent No.: US 10,035,443 B1
(45) Date of Patent: Jul. 31, 2018

(54) HEAD RESTRAINT ASSEMBLY WITH AN INTEGRATED DISPLAY

(71) Applicant: GM GLOBAL TECHNOLOGY OPERATIONS LLC, Detroit, MI (US)

(72) Inventors: Rami Sayed, Farmington Hills, MI (US); Ricco Bates, Chesterfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/421,628

(22) Filed: Feb. 1, 2017

(51) Int. Cl.
*B60N 2/879* (2018.01)
*B60N 2/48* (2006.01)
*B60R 11/02* (2006.01)
*B60R 16/033* (2006.01)
*B60R 11/00* (2006.01)

(52) U.S. Cl.
CPC ........... *B60N 2/879* (2018.02); *B60N 2/4876* (2013.01); *B60R 11/0229* (2013.01); *B60R 16/033* (2013.01); *B60R 2011/008* (2013.01); *B60R 2011/0017* (2013.01)

(58) Field of Classification Search
CPC ... B60N 2/879; B60N 2/897; B60N 2002/899
See application file for complete search history.

(56) References Cited

U.S. PATENT DOCUMENTS

| | | | |
|---|---|---|---|
| 4,854,642 A | 8/1989 | Vidwans | |
| 6,099,077 A | 8/2000 | Isaacson | |
| 7,360,833 B2 * | 4/2008 | Vitito | B60K 35/00 297/217.3 |
| 8,585,140 B2 * | 11/2013 | Chang | B60R 11/0235 297/217.3 |
| 8,625,034 B2 * | 1/2014 | Campbell | B60K 35/00 297/217.3 |
| 9,045,096 B2 * | 6/2015 | Procter | B60R 11/0235 |
| 9,802,519 B2 * | 10/2017 | Subat | B60N 2/809 |
| 2003/0137584 A1 * | 7/2003 | Norvell | B60R 11/0235 348/61 |
| 2004/0113479 A1 * | 6/2004 | Jost | B60N 2/838 297/391 |
| 2005/0099548 A1 * | 5/2005 | Vitito | B60N 2/879 348/837 |
| 2007/0052266 A1 * | 3/2007 | Chu | B60N 2/879 297/217.3 |
| 2009/0315368 A1 * | 12/2009 | Mitchell | B60R 11/0235 297/188.04 |
| 2010/0127542 A1 * | 5/2010 | Nishiura | B60N 2/879 297/217.3 |
| 2010/0164271 A1 * | 7/2010 | Song | B60N 2/818 297/410 |
| 2010/0244505 A1 | 9/2010 | Demick | |
| 2011/0049943 A1 * | 3/2011 | Liu | B60N 2/879 297/188.04 |

(Continued)

Primary Examiner — Timothy J Brindley

(57) ABSTRACT

A head restraint assembly is presented herein. The assembly includes a head restraint pad, post, nonconductive collar, and electronic male component. The post is connected to and configured for supporting the head restraint pad. The nonconductive collar is configured to connect to the post, the collar including at least one region of conductive material. The electronic male component is configured to be wired to the region of conductive material of the collar via the post.

20 Claims, 4 Drawing Sheets

(56) References Cited

U.S. PATENT DOCUMENTS

| | | | | |
|---|---|---|---|---|
| 2013/0127215 A1* | 5/2013 | Dumont | ............... | B60N 2/4876 |
| | | | | 297/217.3 |
| 2013/0264851 A1* | 10/2013 | Kim | ..................... | B60R 16/03 |
| | | | | 297/217.3 |
| 2016/0200232 A1* | 7/2016 | Tamura | .................... | B60N 2/80 |
| | | | | 297/452.18 |

* cited by examiner

HEAD RESTRAINT ASSEMBLY WITH AN INTEGRATED DISPLAY

INTRODUCTION

Many modern-day vehicles come with seat back video monitors installed during vehicle manufacture. These entertainment systems conveniently provide the opportunity for passengers sitting in the back rows to view video programs during long trips, as they are generally mounted onto the back of a head restraint assembly that has been permanently affixed to the rest of the seat. Unfortunately, however, permanent mounting configurations make display maintenance difficult. Service technicians are often forced to disassemble the entire seat back to work on the display. Entertainment system components may moreover be difficult to attain from distant suppliers/manufacturers on short notice. Thus, making display maintenance even more inconvenient. What is therefore desired is a universal head restraint assembly which can be removed from the seat to allow entertainment system maintenance without seat disassembly and can be easily replaced so as to avoid needing to wait for vital components to arrive.

SUMMARY

A head restraint assembly is presented herein. The assembly includes a head restraint pad, post, nonconductive collar, and electronic male component. The post is connected to and configured for supporting the head restraint pad. The nonconductive collar is configured to connect to the post, the collar including at least one region of conductive material. The electronic male component is configured to be wired to the region of conductive material of the collar via the post.

The head restraint assembly may further include a seat back, bushing, and conductive receiver. The seat back is configured to be installed within a vehicle interior so as to connect with the vehicle power source. The bushing is configured to mount into the seat back and has an internal bore configured to receive the post. The conductive receiver is configured to mount within the bore and is configured to be wired to the vehicle power source via the seat back.

The receiver may be made of metallic material and include at least one tab connector. This tab being configured to establish an electrical connection between the region of conductive material and vehicle power source. The bushing may be made of nonconductive plastic.

The head restraint assembly may also further include a display with an electronic female component configured to receive the electronic male component. Moreover, upon the electronic male component being operatively received by the electronic female component, electric power may be provided to the display.

The head restraint assembly may also further include a carrier member configured to mount onto the head restraint pad. The carrier member being further configured to receive the display therein such that the display is pivotally mounted to the carrier member. The display may be a flat panel, flexible panel, LCD, LED, or OLED display.

The electronic male component may be a USB male port or Micro USB male port and the electronic female component may be a USB female port or Micro USB female port. The collar may be made of plastic. The region of conductive material may be metallic material printed, embossed, molded, or adhesively joined to the exterior surface of the collar.

Another head restraint assembly is presented herein. This assembly includes a head restraint pad, display, and plurality of hollow posts. The hollow posts are connected to and configured for supporting the head restraint pad. A nonconductive collar is also connected to the distal end of each post, each collar including at least one region of conductive material. The display is wired to the region of conductive material of each collar via the central cavity within each hollow post.

A head restraint assembly system is further presented herein. The system includes a seat back, plurality of tubular bushings, head restraint pad, two posts, and plastic collar. The seat back is installed within a vehicle interior and wired to the vehicle power source. The bushings are mounted into the seat back, each bushing with an internal bore. The head restraint pad has an electronic male component mounted thereto. The posts are connected to the head restraint pad, each post being configured to releasably insert into the bore of a corresponding tubular bushing to provide support for the head restraint pad. The collar is connected to the distal end of each post and includes at least one region of conductive material. Moreover, upon the posts being releasably inserted into their respective bushing, a circuit is created between the electronic male component and the vehicle power source so as to operatively provide electric power to the electronic male component. Electric current may also travel through each post such that one post can maintain the positive flow of electric current from the vehicle power source to the display, and whereas the other post can act as ground.

The system may further include a display that has an electronic female component configured to receive the electronic male component. Moreover, upon the electronic male component being operatively received by the electronic female component, electric power may be provided to the display.

The above features and advantages and other features and advantages of the present teachings are readily apparent from the following detailed description for carrying out the teachings when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
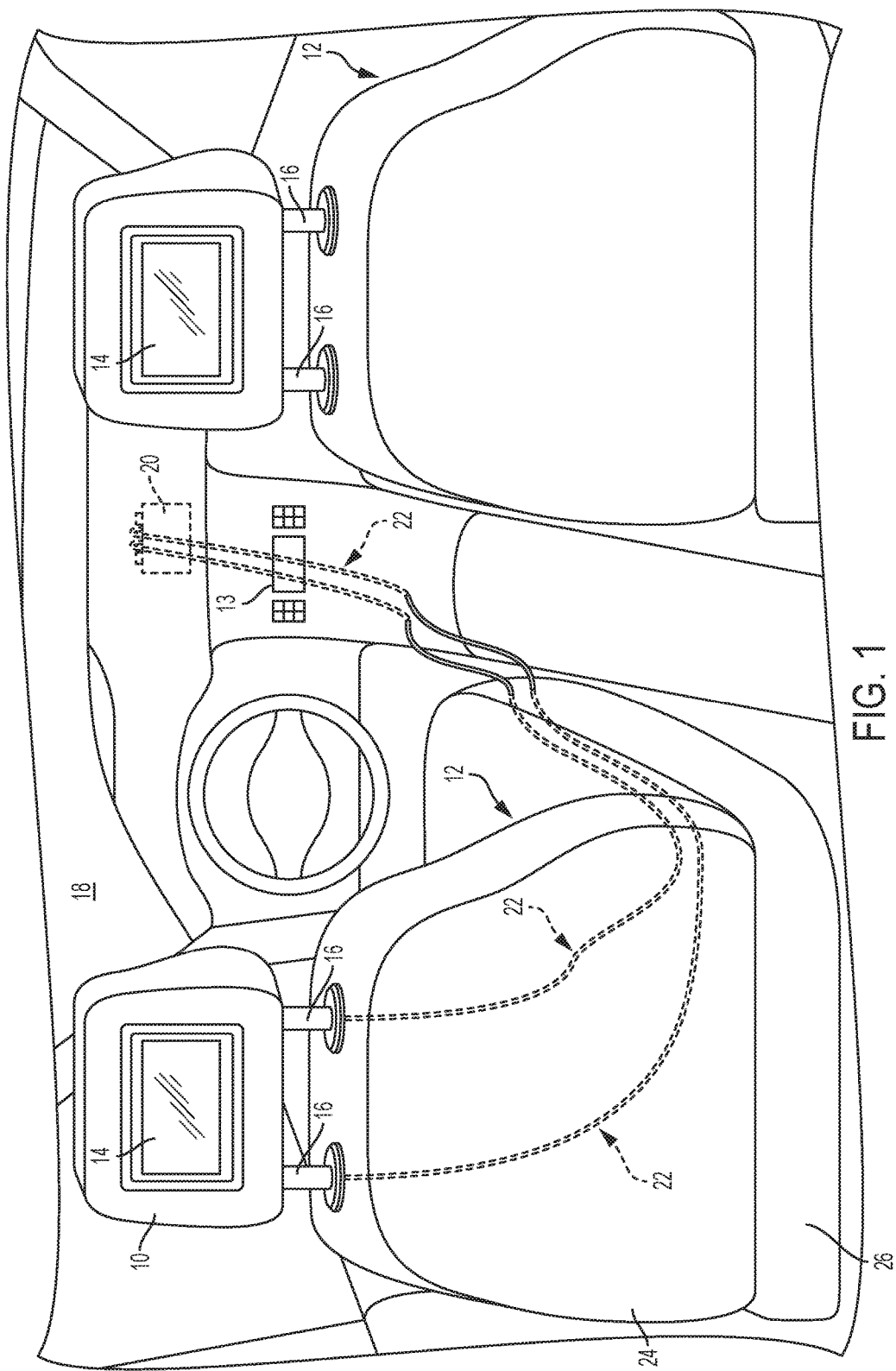
FIG. 1 illustrates a vehicle seat and an embodiment of a head restraint assembly system as typically installed in a vehicle environment.

FIG. 1 illustrates a head restraint pad 10 for a first-row vehicle seat 12 with an integrated display 14 mounted onto the back side of restraint pad 10. As illustrated, restraint pad 10 is connected to the seat 12, and supported in an upright fashion, by two rigid posts 16, allowing for an upright and vertical positioning of restraint pad 10. As shown, display 14 is firmly mounted within the bulk of restraint pad 10 such that the display's front surface is either flush with or recessed from the contour of restraint pad 10. The shown embodiment of display 14 also incorporates a generally rectangle shape with a planar front surface which can be viewed by a passenger in the second seat row of the vehicle interior 18. Display moreover can receive video signals from a media player (not shown) or infotainment system 13 for viewing, entertainment programming such as, but not limited to, television, movies, and internet video sites. Skilled artisans will see that display may have a generally known LCD (liquid crystal display), LED (light emitting diode display), or OLED (organic light emitting diode display) composition. Other panel-type devices, such as flat panel or flexible panel display devices may also be used as display 14. Moreover, it should be appreciated that the vehicle seats 12 and vehicle interior 18, can be of various types or models of generally known and not shown herein.

Vehicle seats 12 are separately connected to the vehicle battery 20 power supply (otherwise known as the vehicle main) through flexible wiring 22 that is connected to a wire harness (not shown) typically internally located within the seat back 24 or cushion 26. As will be discussed further below, wiring 22 runs entirely through the seat back 24 and is connected to a head restraint assembly that provides power to display 14. This allows one lead 22 from battery 20 to maintain a positive flow of electric current from the positive terminal of battery 20 and the other to be connected to the vehicle ground or the negative terminal of battery 20. It should be appreciated that configurations of the wiring, as protruding from the seat cushion 26, other than the configuration shown herein, may be implemented to connect the head restraint assembly system with battery 20.

Figure 2:
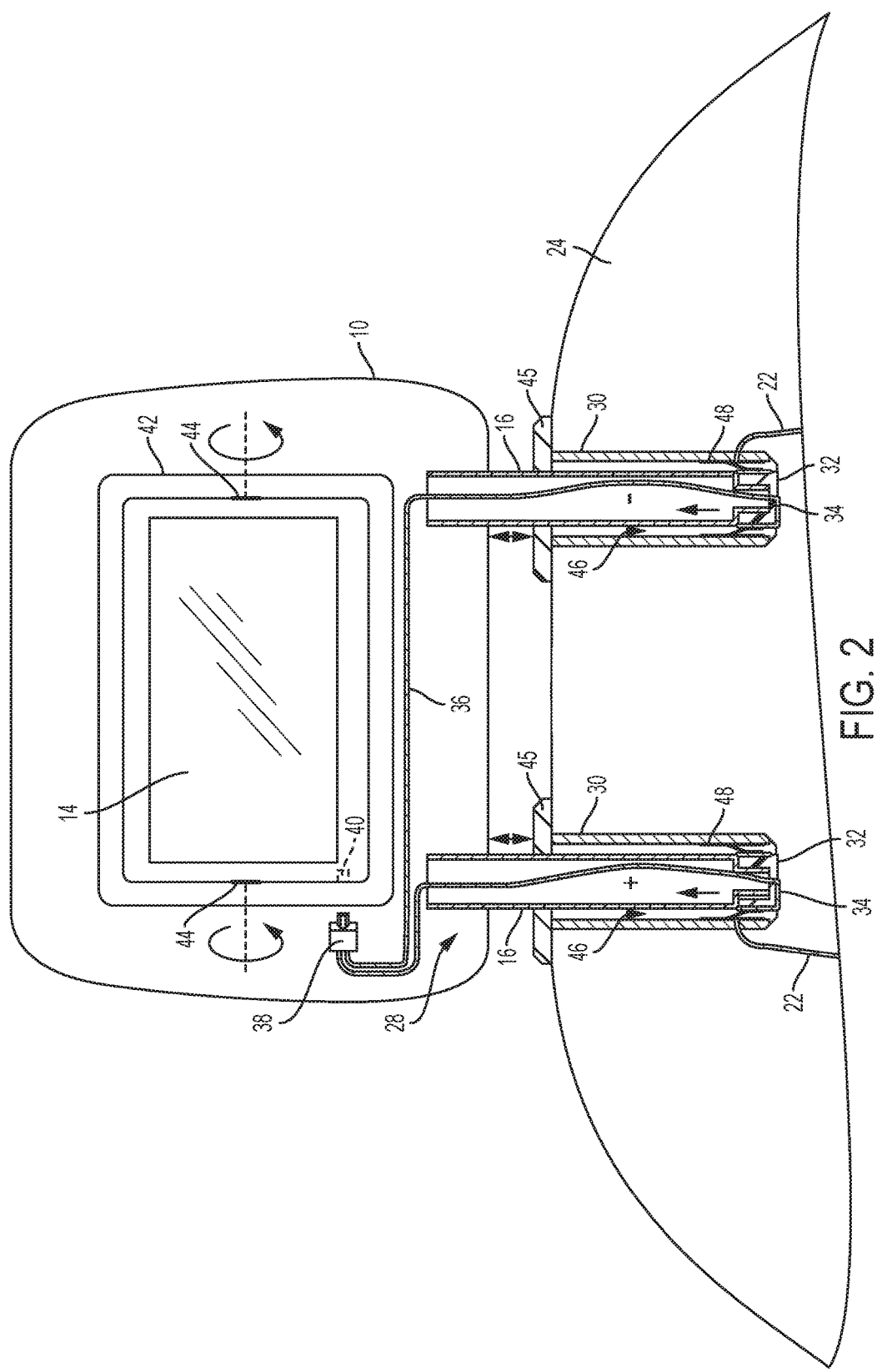
FIG. 2 is a schematic view of an embodiment of a head restraint assembly system.
Figure 3:
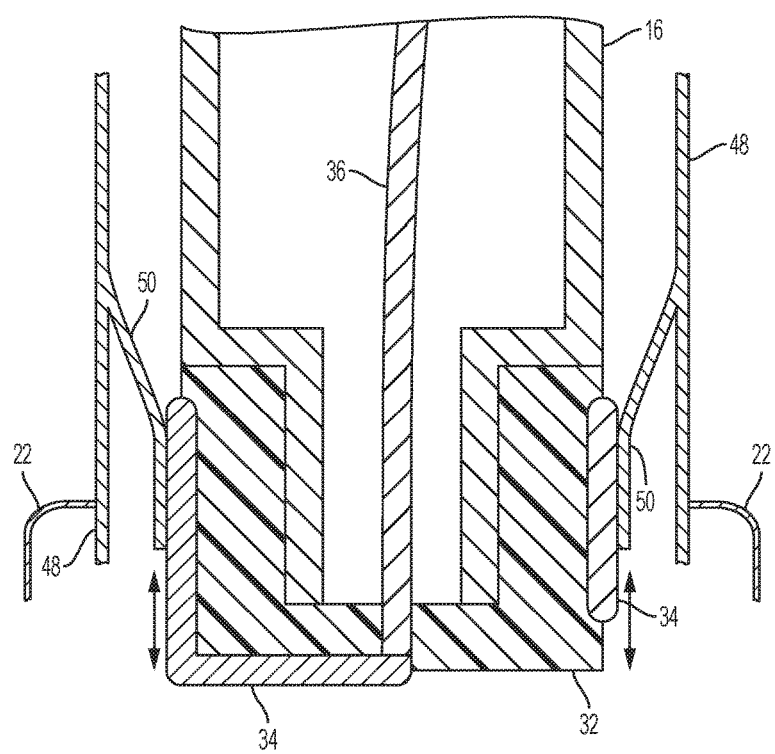
FIG. 3 is a schematic view of an aspect of the head restraint assembly system.

FIG. 2 illustrates an embodiment of the head restraint assembly system 28 as installed in head restraint pad 10 and seat back 24. System 28 includes a head rest assembly aspect installed onto restraint pad 10 and two nonconductive-plastic bushings 30 mounted into seat back 24. As shown, the head rest assembly aspect incorporates both posts 16 having a circular and nonconductive-plastic collar 32 slidably mounted onto their distal end. The proximal end of each post in turn being mounted to restraint pad 10 (e.g., sewn into the bulk). With reference to FIG. 3, each collar 32 includes one or more conductive metal regions 34 (e.g., leads/strips) printed around the sides of the exterior surface. In addition, at least one portion of the metallic material 34 is printed at the flat end of the collar 32 and connects with a wire lead 36 which runs through the central cavity within the hollow center of the collar's respective post 16. In embodiments where posts 16 are constructed from conductive material (e.g., metals), the metallic material 34 should not make contact with the corresponding post 16 such that there is a spacial nonconductive gap between the metallic material 34 and post 16, to isolate electrical current from reaching post 16. It should be understood that the metallic material 34 may also be, but is not limited to being, embossed, molded, or adhesively joined around the sides of the exterior surface of collar 32.

Returning to FIG. 2, the flexible line of wire 36 in both posts 16 is connected at the end opposite the respective collar 32 to an electronic male component 38 which may be, but is not limited to, a generally known USB (universal serial bus) male port or Micro USB male port. Correspondingly, display 14 includes an electronic female component 40 that can receive the male component 38 and which may be, but is not limited to, a generally known USB (universal serial bus) female port or Micro USB female port (depending on the embodiment of the male component 38). Furthermore, when female component 40 receives male component 38, and therefore both are linked, electric power from battery 20 may be provided to display 14.

Display 14 may be mounted to head restraint pad 10 via a carrier member 42. Carrier member 42 may further include side-fastener pivot points 44 that can be adjusted to provide for an optimal viewing angle. Display 14 may moreover be mounted to carrier member 42 through fasteners or the like. Carrier member 42 may be made of plastic and may be mounted to restraint pad 10 through generally known methods such as, but not limited to, being sewn onto the back of restraint pad 10 or fasteners.

Each bushing 30 is tubular in shape and burrowed into and mounted within seat back 24. The bushing 30 further incorporates a head portion 45 formed at the upper end thereof which engages the outer surface of seat back 24 when mounted. An internal bore 46 is centrally located within each bushing 30 and has a diameter larger than that of the corresponding post 16 for insertion purposes. A conductive-metal receiver 48 is mounted towards the bottom portion of each bore 46 such that it can make contact with one or more of the metallic material regions 34 on the corresponding collar 32.

Figure 4:
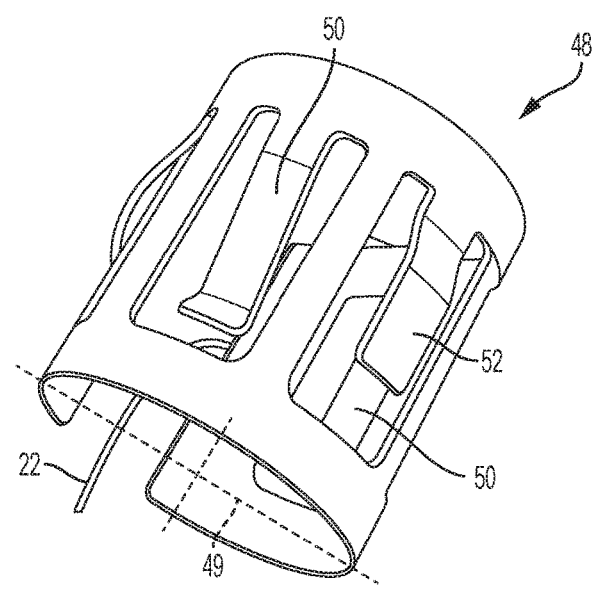
FIG. 4 is a perspective view of another aspect of the head restraint assembly system.

With additional reference to FIG. 4, the receiver 48 has a C-shaped cross section 49 and includes at least one spring tab connector 50. It is this tab 50 that can releasably establish spring contact with the metal regions 34 on collar 32. One or more positioners 52 are also included to ensure collar 32 remains static within the bore 46 through spring force. As such, when a post 16 is properly inserted into and removed from bore 46, the respective collar 32 may slide into and out of receiver 48, making contact without dislodging receiver 48.

Wiring 22 is connected to receiver 48 (e.g., via soldering). Thus, when battery 20 (FIG. 1) provides power, electric current will travel along the flexible wiring 22 to receiver 48. When the head rest assembly system 28 is complete (i.e., when the assembly aspect is properly installed into the bushings), electric current will then travel from receiver 48 to the electronic male component 38 via the established spring connection between tab 50 and metal regions 34. As a result, display 14 can be provided power by wiring 36 when connected to male component 38. Skilled artisans will therefore understand that a simple circuit is created between the display 14 and battery 20 to operatively provide power to display 14. Skilled artisans will further understand, as mentioned above, that the wiring 36 in one of the posts 16 can maintain a positive flow of current from the positive terminal of battery 20 while the other wiring 36 in the opposing post 16 can be connected to ground or the negative terminal of battery 20. Skilled artisans will further yet understand that other non-disclosed electric/electronic components may be connected to this circuit without deviating from the present disclosure.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A head restraint assembly system comprising:
    a head restraint pad;
    a post connected to and configured for supporting the head restraint pad;
    a nonconductive collar configured to connect to the post, the collar comprising at least one region of conductive material;
    an electronic male component configured to be wired to the region of conductive material of the collar via the post;
    a seat back configured to be installed within a vehicle interior so as to connect with a vehicle power source;
    a bushing configured to mount into the seat back, the bushing having an internal bore configured to receive the post; and
    a conductive receiver having a C-shaped cross section and being configured to mount within the bore, the receiver configured to be wired to the vehicle power source via the seat back, and the receiver comprising a spring tab connector configured to releasably establish spring contact with the at least one region of conductive material to establish an electrical connection between the region of conductive and vehicle power source.

2. The system of claim 1, wherein the bushing is made of nonconductive plastic.

3. The system of claim 1, further comprising:
    a display having an electronic female component configured to receive the electronic male component; and
    wherein, upon the electronic male component being operatively received by the electronic female component, electric power may be provided to the display.

4. The system of claim 3, further comprising:
    a carrier member configured to mount onto the head restraint pad, the carrier member further configured to receive the display therein such that the display is pivotally mounted to the carrier member.

5. The system of claim 3, wherein the display is a flat panel, flexible panel, LCD, LED, or OLED display.

6. The system of claim 3, wherein:
    the electronic male component is a USB male port or Micro USB male port; and
    the electronic female component is a USB female port or Micro USB female port.

7. The system of claim 1, wherein the collar is made of plastic.

8. The system of claim 1, wherein the region of conductive material is metallic material printed, embossed, molded, or adhesively joined to the exterior surface of the collar.

9. The system of claim 1, wherein the receiver comprises a plurality of spring tab connectors circumferentially distributed around the receiver, each of the spring tab connectors configured to releasably establish spring contact with the at least one region of conductive material.

10. The system of claim 1, wherein the receiver is configured to insertably receive the collar.

11. A head restraint assembly system comprising:
    a head restraint pad;
    a plurality of hollow posts connected to and configured for supporting the head restraint pad;
    a nonconductive collar connected to the distal end of each post, each collar comprising at least one region of conductive material; and
    a display wired to the region of conductive material of each collar via the central cavity within each hollow post; and
    a seat back configured to be installed within a vehicle interior so as to connect with a vehicle power source;
    a plurality of tubular bushings mounted into the seat back, each bushing having an internal bore configured to receive a corresponding post of the plurality of hollow posts; and
    a conductive receiver having a C-shaped cross section and being configured to mount within the bore, the receiver configured to be wired to the vehicle power source via the seat back, and the receiver comprising a spring tab connector configured to releasably establish spring contact with the at least one region of conductive material to establish an electrical connection between the region of conductive and vehicle power source.

12. The system of claim 11, wherein the region of conductive material is metallic material printed, embossed, molded, or adhesively joined to the exterior surface of the collar.

13. The system of claim 11, wherein the receiver comprises a plurality of spring tab connectors circumferentially distributed around the receiver, each of the spring tab connectors configured to releasably establish spring contact with the at least one region of conductive material.

14. The system of claim 11, wherein the receiver is configured to insertably receive the collar.

15. A head restraint assembly comprising:
    a head restraint pad;
    a plurality of hollow posts connected to and configured for supporting the head restraint pad;
    a nonconductive collar connected to the distal end of each post, each collar comprising at least one region of conductive material; and
    a display wired to the region of conductive material of each collar via the central cavity within each hollow post; and
    wherein the linking of a Micro USB male port and Micro USB female port completes the wired connection between the display and region of conductive material of each collar.

16. A head restraint assembly system comprising:
a seat back installed within a vehicle interior and wired to the vehicle power source;
a plurality of tubular plastic bushings mounted into the seat back, each bushing having an internal bore;
a conductive receiver installed within each bore, each conductive receiver having a C-shaped cross section;
a head restraint pad having an electronic male component mounted thereto;
two posts connected to the head restraint pad, each post configured to releasably insert into the bore of a corresponding tubular bushing to provide support for the head restraint pad;
a plastic collar connected to the distal end of each post, the collar comprising at least one region of conductive material; and
wherein, upon the posts being releasably inserted into their respective bushing, a circuit is created between the electronic male component and the vehicle power source via a connection of the respective receiver and the at least one region of conductive material of the respective plastic collar so as to operatively provide electric power to the electronic male component.

17. The system of claim 16, further comprising:
a display having an electronic female component configured to receive the electronic male component; and
wherein, upon the electronic male component being operatively received by the electronic female component, electric power may be provided to the display.

18. The system of claim 16, wherein electric current may travel through each post such that one post can maintain the positive flow of electric current from the vehicle power source to the display, and whereas the other post can act as ground.

19. The system of claim 16, wherein the conductive receiver is made of metallic material and comprises at least one tab connector, the tab configured to establish the connection between the respective receiver and the at least one region of conductive material of the respective plastic collar.

20. The system of claim 16, wherein the conductive receiver comprises a plurality of tab connectors circumferentially distributed around the receiver, each of the tab connectors configured to establish the connection of the respective receiver and the at least one region of conductive material of the respective plastic collar.

* * * * *